United States Patent [19]

DeKoning et al.

[11] Patent Number: 5,787,242
[45] Date of Patent: Jul. 28, 1998

[54] METHOD AND APPARATUS FOR TREATMENT OF DEFERRED WRITE DATA FOR A DEAD RAID DEVICE

[75] Inventors: Rodney A. DeKoning; Donald R. Humlicek; Max L. Johnson, all of Wichita, Kans.

[73] Assignee: Symbios Logic Inc., Fort Collins, Colo.

[21] Appl. No.: 580,566

[22] Filed: Dec. 29, 1995

[51] Int. Cl.⁶ .............................. G06F 11/00; G06F 12/00
[52] U.S. Cl. ........................................ 395/182.03; 395/427
[58] Field of Search .................... 395/182.03, 182.04, 395/182.05, 182.06, 427, 441, 439, 440

[56] References Cited

U.S. PATENT DOCUMENTS

| | | | |
|---|---|---|---|
| 4,420,807 | 12/1983 | Nolta et al. | |
| 5,274,799 | 12/1993 | Brant et al. | 395/575 |
| 5,303,244 | 4/1994 | Watson | 371/10.1 |
| 5,390,187 | 2/1995 | Stallmo | 371/10.1 |
| 5,418,925 | 5/1995 | DeMoss et al. | 395/425 |
| 5,437,022 | 7/1995 | Beardsley et al. | 395/182.04 |
| 5,440,727 | 8/1995 | Bhide et al. | 395/182.08 |

*Primary Examiner*—Albert Décady
*Attorney, Agent, or Firm*—Daniel N. Fishman; Wayne P. Bailey

[57] ABSTRACT

Methods and apparatus for moving pinned data corresponding to a temporarily dead RAID device between the cache memory of a RAID subsystem and a log area. In response to detection of a dead RAID device within a RAID subsystem, the methods of the present invention move any pinned data from the cache memory of the RAID controller to a log area preferably allocated on the disk space of one or more operational RAID devices within the subsystem. In response to revival of the dead RAID device methods of the present invention restore the logged, pinned data from the log area of the operational RAID device(s) to the cache memory as dirty data ready for posting to the revived RAID device. The log area may be either permanently allocated within the RAID subsystem, or may be dynamically allocated in response to recognition of the dead RAID device and freed in response to revival of the RAID device.

18 Claims, 2 Drawing Sheets

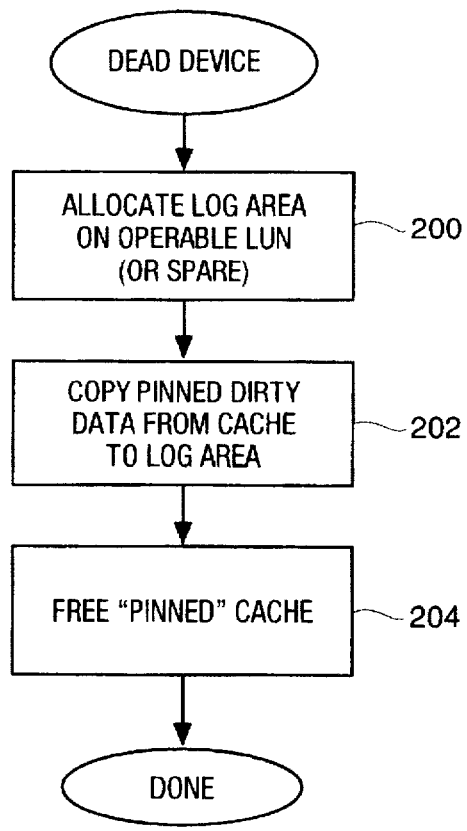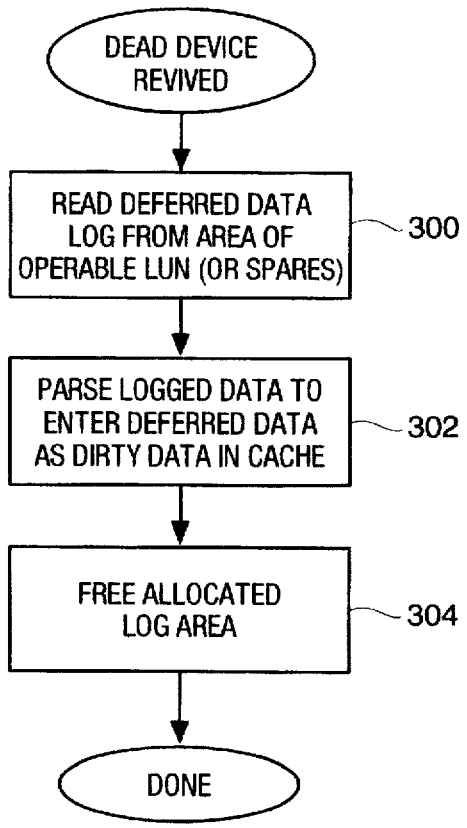

METHOD AND APPARATUS FOR TREATMENT OF DEFERRED WRITE DATA FOR A DEAD RAID DEVICE

BACKGROUND OF THE INVENTION

1. Field of the Invention

The present invention relates to the control of disk array storage subsystems and in particular to the treatment of deferred (also referred to as pinned) write data in a cache corresponding to a dead RAID device.

2. Background of the Invention

Modern mass storage subsystems are continuing to provide increasing storage capacities to fulfill user demands from host computer system applications. Due to this critical reliance on large capacity mass storage, demands for enhanced reliability are also high. Various storage device configurations and geometries are commonly applied to meet the demands for higher storage capacity while maintaining or enhancing reliability of the mass storage subsystems.

A popular solution to these mass storage demands for increased capacity and reliability is the use of multiple smaller storage modules configured in geometries that permit redundancy of stored data to assure data integrity in case of various failures. In many such redundant subsystems, recovery from many common failures can be automated within the storage subsystem itself due to the use of data redundancy, error codes, and so-called "hot spares" (extra storage modules which may be activated to replace a failed, previously active storage module). These subsystems are typically referred to as redundant arrays of inexpensive (or independent) disks (or more commonly by the acronym RAID). The 1987 publication by David A. Patterson, et al., from University of California at Berkeley entitled *A Case for Redundant Arrays of Inexpensive Disks (RAID)*, reviews the fundamental concepts of RAID technology.

RAID level zero, also commonly referred to as disk striping, distributes data stored on a storage subsystem across a plurality of disk drives to permit parallel operation of a plurality of disk drives thereby improving the performance of I/O write requests to the storage subsystem. Though RAID level zero functionality improves I/O write operation performance, reliability of the disk array subsystem is decreased as compared to that of a single large disk drive. To improve reliability of disk arrays, other RAID geometries for data storage include generation and storage of redundancy information to permit continued operation of the disk array through certain common failure modes of the disk drives in the disk array.

There are five "levels" of standard RAID geometries which include redundancy information as defined in the Patterson publication. The simplest array, a RAID level 1 system, comprises one or more disks for storing data and an equal number of additional "mirror" disks for storing copies of the information written to the data disks. The remaining RAID levels, identified as RAID levels 2, 3, 4 and 5 systems, segment the data into portions for storage across several data disks. One or more additional disks are utilized to store error check or parity information. The methods of the present invention may be useful in conjunction with any of the standard RAID levels including level 0.

RAID storage subsystems typically utilize a control module that shields the user or host system from the details of managing the redundant array. The controller makes the subsystem appear to the host computer as one (or more), highly reliable, high capacity disk drive. In fact, the RAID controller may distribute the host computer system supplied data across a plurality of the small independent drives with redundancy and error checking information so as to improve subsystem reliability. Frequently RAID subsystems provide large cache memory structures to further improve the performance of the RAID subsystem. The cache memory is associated with the control module such that the storage blocks on the disk array are mapped to blocks in the cache. This mapping is also transparent to the host system. The host system simply requests blocks of data to be read or written and the RAID controller manipulates the disk array and cache memory as required.

It is common that RAID subsystems define and control a plurality of RAID storage devices within a single subsystem. Each device is defined by a logical grouping of disk drives by the RAID controller and is identified within the RAID subsystem by a unique logical unit number (LUN). The RAID controller shares its large cache memory among all the LUNs which it controls. Higher performance RAID controllers utilize the cache memory with a write-back technique in which the host computer requesting the write is permitted to continue as soon as the requested write data is entered into the cache memory of the RAID controller. A background operation within the RAID controller eventually posts the cached write data (dirty data) on the disk devices to which it was originally destined.

RAID devices are generally designed to withstand the failure of a single disk drive in the devices array configuration. However, most configurations cannot remain operable through a failure of two or more disk drives in the device's disk array. Such an inoperable array is referred to herein as "dead." Several failure modes of a dead device may be easily recovered by simple repairs which do not affect the data content of the disk drives. For example, an intermittent cable/bus connection may be repaired by simply re-attaching the disk cables. In such cases, the dead device may be rapidly recovered without loss of data integrity. The pinned data saved in the cache and corresponding to the dead device is then eventually posted to the revived device in the normal course of operation of the background processing.

It is a problem in such RAID subsystems to manage the cached write data (dirty data) when a RAID device dies (becomes inoperable). The dirty data not yet posted to the disk drives remains in the cache memory (herein also referred to as pinned data) until the inoperable device is repaired or replaced. The pinned data occupies valuable space in the cache memory awaiting the repair of the dead RAID device. The cache memory space occupied by the pinned data is unavailable for use by the RAID controller for other operable RAID devices within the subsystem. Though cache memories in RAID controllers can be quite large, use of the cache memory is vital to maintaining overall performance of the RAID subsystem. The overall performance of the RAID subsystem may be impaired by the reduced availability of cache memory for use with other RAID devices (LUNs) managed by the RAID controller.

It is evident from the above discussion that a need exists for maintaining the performance of a RAID subsystem by improving the utilization of cache memory within the RAID controller despite the need to maintain pinned data awaiting the repair of an inoperable RAID device.

SUMMARY OF THE INVENTION

The present invention solves the above and other problems, thereby advancing the state of the useful arts, by providing a method and associated apparatus for logging the pinned data to a reserved, or dynamically allocated, area of the RAID subsystem to thereby free the cache memory for use by the RAID controller in connection with operable RAID devices. In particular, the pinned data in the writeback cache of the RAID controller is written to a log area in the RAID subsystem in response to a RAID device transitioning to a dead status. The log area is either reserved in advance on other RAID devices within the RAID subsystem or may be dynamically allocated in response to the sensing of a transition to a dead status by a RAID device. The log area is of adequate size to store all dirty data in the write cache which corresponds to the dead device.

The logged write cache data is then freed from the write cache to permit the RAID controller to use the entire cache memory for other operable RAID devices. The overall performance of the RAID subsystem is thereby improved by allowing the RAID controller to utilize the entire cache memory in conjunction with the remaining operable RAID devices rather than maintaining a portion of the cache memory for retention of the pinned data.

In response to the dead device making a transition to a revived status, the RAID controller reads the log of pinned data and writes the pinned data to the write cache as dirty data for future posting to the revived RAID device. If the log area was dynamically allocated in response to the dead RAID device, the allocated log area may then be released for continued use in the RAID subsystem.

It is therefore an object of the present invention to provide methods and associated apparatus for maintaining deferred data for later posting to a dead RAID device.

It is further an object of the present invention to provide methods and associated apparatus for maintaining deferred data for later posting to a dead RAID device while improving performance of the RAID subsystem.

It is another object of the present invention to provide methods and associated apparatus for maintaining deferred data in a RAID subsystem while permitting maximum utilization of cache memory in the RAID controller.

It is still another object of the present invention to provide methods and associated apparatus for maintaining deferred data in a RAID subsystem without reserving areas of cache memory within the RAID controller for maintenance of the deferred data.

The above and other objects, aspects, features, and advantages of the present invention will become apparent from the following description and the attached drawing.

BRIEF DESCRIPTION OF THE DRAWINGS

FIG. 2 is a flowchart describing the methods of the present invention invoked in response to a RAID device transitioning to a dead status; and FIG. 3 is a flowchart describing the methods of the present invention invoked in response to a RAID device returning to an operable status.

DETAILED DESCRIPTION OF THE INVENTION

Figure 1:
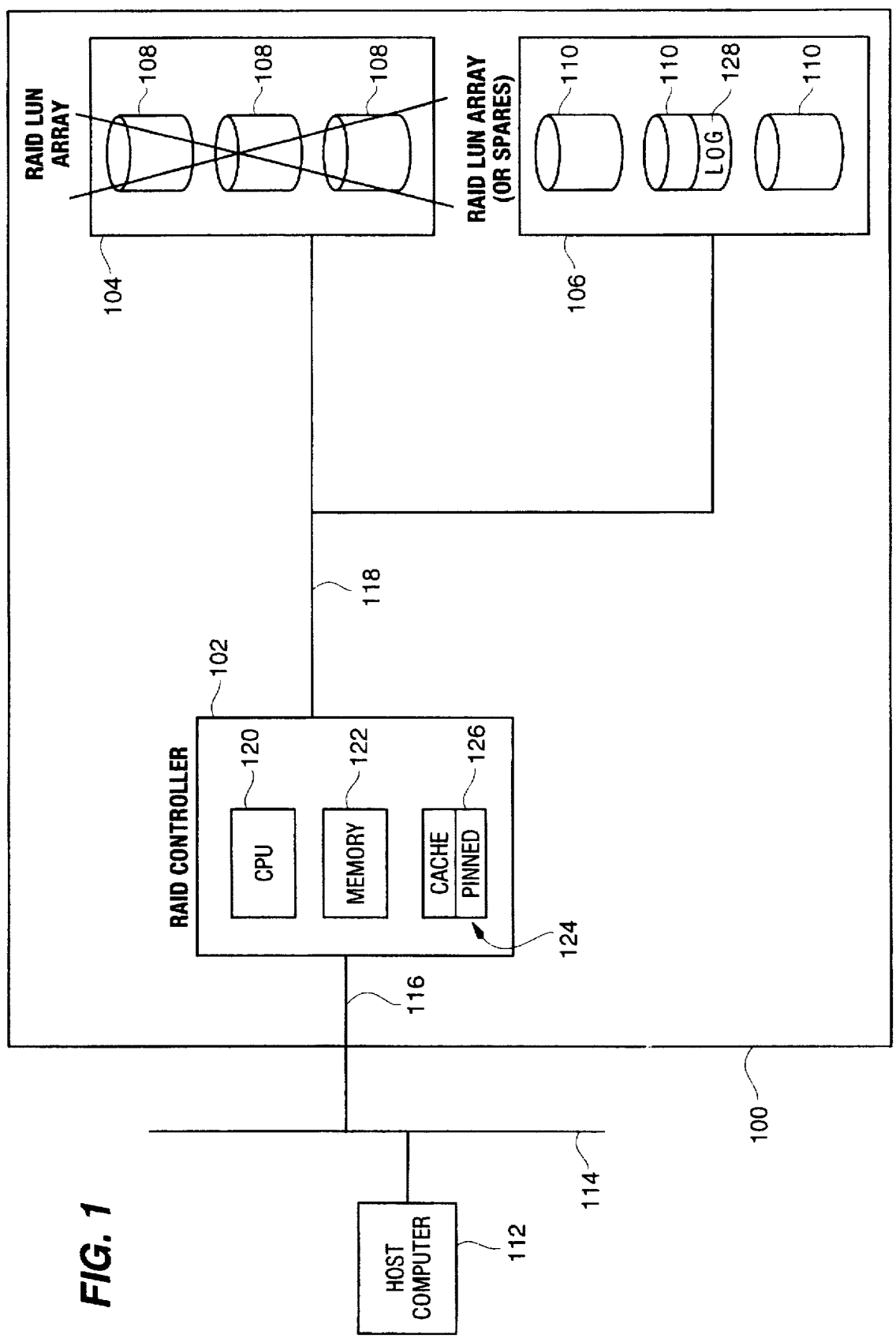
FIG. 1 is a block diagram depicting a typical RAID storage subsystem in which the methods and associated apparatus of the present invention may be advantageously applied.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

FIG. 1 depicts a RAID storage subsystem 100 operable in accordance with the methods and structures of the present invention. RAID controller 102 is connected to one (or more) host computer systems 112 via bus 114 and interface 116. As is known to those of ordinary skill in the art, bus 114 may comply with any of several interface standards including: fiber channel, SCSI, Ethernet, etc. Interface 116 adapts RAID controller 102 to communicate with attached host computer(s) 112 via the standard bus 114. SCSI or local area network (LAN) attachments to host computer systems 112 are common for RAID storage subsystems.

RAID controller 102 is connected to disk drives 108 of group 104 and to disk drives 110 of group 106 via interface bus 118. Groups 104 and 106 are each a logical grouping of the array of disk drives 108 and 110 used for storage and redundancy control of the information stored in the RAID subsystem 100. These groups 104 and 106 are also referred to herein as RAID devices. Each is typically independently configurable by RAID controller 102 to store and retrieve information (data and redundancy or error checking information) according any of the several RAID storage standards including so called RAID levels 0–5. Interface bus 118 may be any of several well known interface busses for connection of disk drives, including: SCSI, IDE, EIDE, IPI, Fiber Channel, etc.

RAID controller 102 is further comprised of CPU 120 in which the methods of the present invention operate, memory 122 wherein the programmed steps of the methods of the present invention and associated data are stored and retrieved, and cache 124 wherein data supplied by a host computer system 112 is written by CPU 120 in response to receipt of a host computer system 112 write request. The data so written to cache 124 is referred to as dirty data until such time as a background process operable within CPU 120 posts the dirt data to the disk drives 108 or 110 in the RAID device 104 or 106 to which the requesting host computer system 112 directed its write request. Once posted, the space occupied by the dirty data in cache 124 is available for re-use by CPU 120 to complete another write request from a host computer system 112. Such cache 124 operations are often referred to as write-back caching and is well known to those of ordinary skill in the art.

RAID device 104 is shown in FIG. 1 to inoperable as indicated by being marked with an "X." RAID device 104 is therefore referred to herein as a failed device or as a dead device. In certain failure modes, one or more disk drives 108 in the dead device may need to be physically replaced to correct the problem and restore the RAID device to an operable status by rebuilding the lost data on the replaced disk drive(s). However, a significant number of failure modes may be characterized in that the RAID device may be restored to an operable status by simple operations other than replacement of disk drives in the dead device. For example, a dislodged data, control, or power cable may be simply replaced without any loss of data integrity in the dead device and without the need for rebuilding the data on dead device.

It is desirable to retain any dirty data resident in cache 124 and associated with the dead device 104 until the device is restored to an operational status so that the dirty data may then be posted to the operational, restored device. In particular, in failure modes noted above wherein the dead device may be rapidly revived by simple operator intervention (short of disk drive replacement and rebuild operations—e.g. reseating a dislodged data, control, or power cable), the deferred data (pinned data) 126 in the write-back cache 124 which is associated with the dead device may be saved until the operator intervenes to revive the dead RAID device.

However, saving the pinned data 126 in the cache 124 of the RAID controller 102 may reduce the overall throughput of the RAID subsystem 100 by reducing the amount of write-back cache 124 available for continued functioning of the remaining operational RAID devices (i.e. 106) within the subsystem. In an extreme case wherein all data in the cache 124 is dirty and pinned, the entire RAID subsystem may be inoperable due to a failure of one RAID device. The present invention therefore provides for the retention of the pinned data 126 by writing the data to a log area 128 of an operational RAID device 106. The log area 128 may be dynamically allocated by the RAID controller 102 in response to its recognition of a failed RAID device or the log area 128 may be statically allocated during initialization of the RAID subsystem 100.

FIGS. 2 and 3 are flowcharts describing the methods of the present invention used to record the pinned data 126 in the log area 128 and to recover the pinned data from the log area 128 in response to revival of the dead RAID device 104. Specifically, the method depicted in the flowchart of FIG. 2 is operable in response to the RAID controller sensing a dead RAID device while the method depicted in the flowchart of FIG. 3 is operable in response to the RAID controller sensing the revival of the previously dead RAID device.

Element 200 of FIG. 2 is first operable in response to the sensing of a dead RAID device to allocate a log area 128 on one or more disk drives 110 of an operable RAID device 106. As noted above, the log area 128 may be statically allocated during initialization of the RAID subsystem such that the processing of element 200 may be skipped. Such a design choice is well known to those of ordinary skill in the art.

Element 202 is next operable to copy the pinned data 126 from the cache memory 124 to the log area 128 of an operation RAID device 104. The pinned data 126 may be copied to the log area 128 verbatim or using any of several well known encoding or compressing methods to reduce the time or space required to copy the pinned data. Element 204 is then operable to free the cache memory 124 corresponding to the pinned data 126 for use by the RAID controller 102 in conjunction with other operable RAID devices (i.e. 106). Following operation of element 204, the entirety of cache memory 124 may be utilized to improve overall throughput in operation of any remaining operable RAID devices 106 within the RAID subsystem 100.

FIG. 3 is a flowchart describing the methods of the present invention which are operable in response to the RAID controller 102 sensing the revival of a previously dead RAID device. As used herein, revival of a dead RAID device means returning the RAID device to an operational state without loss of data stored therein as distinct from, for example, replacement of a failed disk drive forcing a rebuild operation on the dead RAID device. Element 300 is first operable in response to revival of a dead RAID device to read the pinned data previously written to the log area 128 of an operational RAID device 106 by operation of element 202 discussed above. As noted above, the data may be encoded or compressed in any of several well known formats, or may be in unencoded (raw) form. Element 302 is then operable to decode or uncompress (as needed) the data read from the log area 128 by operation of element 300 and copy it back to the cache memory 124 as dirty data ready for posting to the RAID device.

Once the pinned data is restored to the cache memory 124 by operation of element 302, element 304 is then operable to free the allocated log area 128 from the operational RAID device 106. As noted above, one of ordinary skill will readily recognize that the log area 128 may be statically and permanently allocated within the RAID subsystem 100 rather than dynamically allocated. Therefore, as with element 200 noted above with respect to FIG. 2, element 304 may be skipped if the log area 128 is statically and permanently allocated in the RAID subsystem 100.

One of ordinary skill in the art will recognize that should the storage device containing the pinned data be reformatted or deleted from use in the RAID subsystem, the pinned data will be lost. Techniques well known in the art may be employed to prevent such inadvertent loss of pinned data written to a log area. A request to format or delete the storage device(s) which contain the logged data may be rejected or deferred by the RAID controller 102 until such time as the logged data is freed by operation of the methods of the present invention to restore the logged data to the cache 124.

While the invention has been illustrated and described in detail in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. In a RAID subsystem having a plurality of RAID devices and a RAID controller having a memory for caching I/O requests, a method for managing pinned data in a RAID subsystem comprising the steps of:

storing the pinned data from said memory to a log area in said RAID subsystem, wherein said log area is allocated from storage space within the disk drives of an operational one of said plurality of RAID devices; and freeing said memory corresponding to said pinned data for use by said RAID controller in conjunction with other RAID devices in said RAID subsystem.

2. The method of claim 1 further comprising the step of:

allocating said log area in said RAID subsystem dynamically in response to said RAID controller detecting said dead RAID device.

3. The method of claim 1 further comprising the step of:

allocating said log area in said RAID subsystem statically in response to initialization of said RAID controller.

4. The method of claim 1 wherein the step of storing includes the step of:

translating said pinned data to another format for storage in said log area.

5. The method of claim 4 wherein the step of translating comprises the step of:

compressing said pinned data.

6. The method of claim 1 further comprising the steps of:

recognizing revival of said dead RAID device;

restoring the data from said log area to said memory.

7. The method of claim 6 further comprising the step of:

deallocating said log area in said RAID subsystem in response to said the step of restoring.

8. The method of claim 6 wherein the step of restoring includes the step of:

translating said data in said log area to another format for storage in said memory.

9. The method of claim 8 wherein the step of translating comprises the step of:

uncompressing said data.

10. In a RAID subsystem having a plurality of RAID devices and a RAID controller having a memory and adapted to managed pinned data, said controller comprising:

means for storing the pinned data from said memory to a log area in said RAID subsystem, wherein said log area is allocated from storage space within the disk drives of an operational one of said plurality of RAID devices; and means for freeing said memory corresponding to said pinned data for use by said RAID controller in conjunction with other RAID devices in said RAID subsystem.

11. The controller of claim 10 further comprising:

means for allocating said log area in said RAID subsystem dynamically in response to said RAID controller detecting said dead RAID device.

12. The controller of claim 10 further comprising:

means for allocating said log area in said RAID subsystem statically in response to initialization of said RAID controller.

13. The controller of claim 10 wherein the means for storing includes:

means for translating said pinned data to another format for storage in said log area.

14. The controller of claim 13 wherein the means for translating comprises:

means for compressing said pinned data.

15. The controller of claim 10 further comprising:

means for recognizing revival of said dead RAID device;

means for restoring the data from said log area to said memory.

16. The controller of claim 15 further comprising:

means, responsive to said means for restoring, for deallocating said log area in said RAID subsystem.

17. The controller of claim 15 wherein the means for restoring includes:

means for translating said data in said log area to another format for storage in said memory.

18. The controller of claim 17 wherein the means for translating comprises:

uncompressing said data.

* * * * *